(12) United States Patent
Hsia

(10) Patent No.: US 10,485,065 B2
(45) Date of Patent: Nov. 19, 2019

(54) SOLID-STATE LIGHTING WITH A LUMINAIRE CONTROL GEAR

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/458,823

(22) Filed: Jul. 1, 2019

(65) Prior Publication Data

US 2019/0327806 A1 Oct. 24, 2019

Related U.S. Application Data

(63) Continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, (Continued)

(51) Int. Cl.
| | |
|---|---|
| *H05B 33/08* | (2006.01) |
| *H02J 7/02* | (2016.01) |
| *H02M 1/44* | (2007.01) |
| *H02J 7/00* | (2006.01) |
| *H02M 3/156* | (2006.01) |
| *H02M 1/14* | (2006.01) |
| *H02M 7/06* | (2006.01) |
| *H02M 1/42* | (2007.01) |

(52) U.S. Cl.
CPC ........ *H05B 33/0815* (2013.01); *H02J 7/0068* (2013.01); *H02J 7/022* (2013.01); *H02M 1/44* (2013.01); *H02M 3/156* (2013.01); *H05B 33/0845* (2013.01); *H02M 1/14* (2013.01); *H02M 1/4208* (2013.01); *H02M 7/06* (2013.01)

(58) Field of Classification Search
None
See application file for complete search history.

(56) References Cited

U.S. PATENT DOCUMENTS

| | | | | |
|---|---|---|---|---|
| 5,867,377 A | * | 2/1999 | Suranyi | H02J 9/061 307/64 |
| 7,550,873 B2 | * | 6/2009 | Jiang | H02J 9/061 307/64 |

(Continued)

*Primary Examiner* — Minh D A
*Assistant Examiner* — James H Cho
(74) *Attorney, Agent, or Firm* — Han IP PLLC; Andy M. Han

(57) ABSTRACT

A light-emitting diode (LED) lighting system comprising a luminaire and an add-on control gear is used to replace the luminaire operated with AC mains. The luminaire comprises LED arrays and a power supply with a luminaire DC voltage. When a line voltage from the AC mains is unavailable, the add-on control gear is automatically started to provide a control DC voltage greater than a forward voltage across the LED arrays. The add-on control gear comprises a rechargeable battery, a DC-to-DC converter configured to provide the control DC voltage when enabled, and a power detection and control circuit. The power detection and control circuit comprises a transistor circuit and a relay switch, in which the former is configured to enable the DC-to-DC converter, and the latter is configured to couple either the control DC voltage or the luminaire DC voltage to the LED arrays to operate thereon.

27 Claims, 4 Drawing Sheets

Related U.S. Application Data now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 7,592,780 B2 * | 9/2009 | Funabashi | H02J 7/022 320/150 |
| 2016/0344218 A1 * | 11/2016 | Zhang | H02J 7/045 |
| 2017/0279300 A1 * | 9/2017 | Catalano | H02J 7/0068 |

* cited by examiner

SOLID-STATE LIGHTING WITH A LUMINAIRE CONTROL GEAR

CROSS-REFERENCE TO RELATED APPLICATIONS

The present disclosure is part of a continuation-in-part (CIP) application of U.S. patent application Ser. No. 16/432,735, filed 5 Jun. 2019, which is part of CIP application of U.S. patent application Ser. No. 16/401,849, filed 2 May 2019, which is part of CIP application of U.S. patent application Ser. No. 16/296,864, filed 8 Mar. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) lighting systems and more particularly to an LED lighting system that includes an add-on luminaire control gear to provide a direct current (DC) voltage and to operate LED arrays in a luminaire that is normally operated with a line voltage from alternating current (AC) mains.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with an add-on luminaire control gear such that after the LED lamp or the LED luminaire is installed on a ceiling or in a room, the add-on luminaire control gear with an emergency battery system can be readily connected with the LED lamp or the LED luminaire on site to meet regulatory requirements.

SUMMARY

An LED lighting system comprising a luminaire and an add-on luminaire control gear is used to replace a fluorescent or an LED lamp normally operated with the AC mains. The luminaire comprises one or more LED arrays with an intrinsic forward voltage across thereon and a non-integrated power supply with a luminaire DC voltage. When a line voltage from the AC mains is unavailable, the add-on luminaire control gear is automatically started to provide a control DC voltage. The add-on luminaire control gear comprises a rechargeable battery, a second at least one DC-to-DC converter configured to provide the control DC voltage when enabled, and a power detection and control circuit. The power detection and control circuit comprises a transistor circuit and a relay switch, in which the former is configured to enable the second at least one DC-to-DC converter, and the latter is configured to couple either the control DC voltage or the luminaire DC voltage to the one or more LED arrays to operate thereon.

The non-integrated power supply comprises at least two electrical conductors configured to couple to the line voltage from the AC mains, a first full-wave rectifier coupled to the at least two electrical conductors, and an input filter configured to suppress electromagnetic interference (EMI) noises. The non-integrated power supply, a power supply unit, comprises at least one isolated power converter and a first at least one DC-to-DC converter coupled to the first full-wave rectifier via the input filter. The first full-wave rectifier is configured to convert the line voltage from the AC mains into a fifth DC voltage. The at least one isolated power converter comprises a first transformer and a third ground reference and is coupled to the first full-wave rectifier via the input filter. The at least one isolated power converter is configured to improve a power factor, to reduce voltage ripples, and to convert the fifth DC voltage into a sixth DC voltage when the line voltage from the AC mains is available. The first at least one DC-to-DC converter is coupled to the at least one isolated power converter and configured to convert the sixth DC voltage into a seventh DC voltage (i.e. the luminaire DC voltage) with respect to the third ground reference. The at least one isolated power converter and the first at least one DC-to-DC converter are combined to form a current source, in which when the one or more LED arrays require more current than a predetermined maximum, the seventh DC voltage drops accordingly to maintain power conservation. The first at least one DC-to-DC converter may comprise a pair of input ports configured to receive a 0-to-10 V signal, a 1-to-10 V signal, a pulse width modulation (PWM) signal, or a signal from a variable resistor for luminaire dimming applications.

The add-on luminaire control gear further comprises a second full-wave rectifier and a charging circuit. The second full-wave rectifier is coupled to the AC mains and configured to convert the line voltage from the AC mains into a first DC voltage. The charging circuit comprises an isolated step-down converter, a first ground reference, a second ground reference electrically isolated from the first ground reference, a second transformer, a feedback control circuit, a control device, a first electronic switch, and a diode. The charging circuit is coupled to the second full-wave rectifier and configured to convert the first DC voltage into a second DC voltage that charges the rechargeable battery to reach a third DC voltage. The feedback control circuit is configured to monitor the second DC voltage and to regulate the control device according to charging voltage and current requirements. The second transformer comprises a primary winding coupled to the first ground reference and a secondary winding coupled to the second ground reference. The second transformer is configured to provide electrical isolation between the AC mains and the second DC voltage with respect to the second ground reference.

The second at least one DC-to-DC converter comprises a step-up converter comprising an input inductor, a second electronic switch, a logic control device, at least one diode rectifier, and an error amplifier. The second at least one DC-to-DC converter is configured to couple to the third DC voltage from the rechargeable battery and to convert the third DC voltage into a fourth DC voltage (i.e. the control DC voltage) when the line voltage from the AC mains is unavailable. The fourth DC voltage is greater than the intrinsic forward voltage across the one or more LED arrays to make sure the fourth DC voltage can operate the one or more LED arrays when the line voltage from the AC mains is unavailable. The second at least one DC-to-DC converter further comprises an input capacitor and an output capacitor. The input capacitor and the output capacitor are configured to filter out unwanted voltage noises generated from the step-up converter and to boost the third DC voltage into the fourth DC voltage with respect to the second ground reference.

In the add-on luminaire control gear, the transistor circuit is configured to enable and disable the second at least one DC-to-DC converter according to availability of the AC mains, whereas the relay switch comprises a power sensing coil with a pick up voltage and a drop out voltage and is configured to couple either the fourth DC voltage or the seventh DC voltage to the one or more LED arrays to operate thereon. The relay switch further comprises a first pair, a second pair, and a third pair of input electrical terminals. The first pair of input electrical terminals are configured to couple to the fourth DC voltage with respect to the second ground reference, whereas the second pair of input electrical terminals are configured to couple to the seventh DC voltage with respect to third ground reference. In this sense, the relay switch comprises a double-pole double-throw (DPDT) configuration, in which either the fourth DC voltage and the second ground reference or the seventh DC voltage and the third ground reference can be simultaneously coupled to the one or more LED arrays to respectively operate thereon without crosstalk. The third pair of input electrical terminals are configured to receive the pick-up voltage to operate the power sensing coil. The relay switch further comprises a pair of output electrical terminals configured to relay the fourth DC voltage or the seventh DC voltage to the one or more LED arrays to operate thereon. The seventh DC voltage is greater than the intrinsic forward voltage across the one or more LED arrays, same as the fourth DC voltage. However, the second at least one DC-to-DC converter provides an LED driving current less than the first at least one DC-to-DC converter does. The transistor circuit is further configured to disable the relay switch when required.

The power detection and control circuit further comprises a flyback module comprising a diode and a resistor connected in parallel with the diode, in which the diode is with a reverse polarity from the second DC voltage. The flyback module is connected in parallel with the power sensing coil. When the second DC voltage is greater than the third DC voltage, the pick-up voltage is built up for the power sensing coil to operate. The transistor circuit comprises a first transistor, a first resistor, and at least one diode and is configured to couple to the second DC voltage and the third DC voltage and to determine whether the line voltage from the AC mains is available or not. The first transistor is turned on or off to allow or forbid a discharge current from the third DC voltage to flow into the second at least one DC-to-DC converter to enable and disable thereon. The transistor circuit further comprises a second transistor, a second resistor, a voltage regulator, and a resistor-capacitor (RC) circuit. The second transistor, the second resistor, the voltage regulator, and the RC circuit are configured to couple to the first transistor to operate thereon. The transistor circuit further comprises a pair of electrical terminals coupled between the first resistor and the second resistor. The pair of electrical terminals are configured to couple the first transistor to the second transistor to operate the transistor circuit when the pair of electrical terminals are short-circuited. The pair of electrical terminals may be short-circuited by using a jumper, a jumper wire, or a switch. The transistor circuit further comprises a test switch coupled between the second DC voltage and the third DC voltage. When the test switch is pressed, the drop-out voltage is reached, thereby disabling the power sensing coil. In this case, the first transistor is turned on to enable the second at least one DC-to-DC converter. Each of the first electronic switch and the second electronic switch comprises a metal-oxide-semiconductor field-effect transistor (MOSFET) or a transistor.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a first, a second, a third, and so forth does not necessarily represent a part that is mentioned in an ordinal manner, but a particular one.

DETAILED DESCRIPTION OF THE INVENTION

Figure 1:
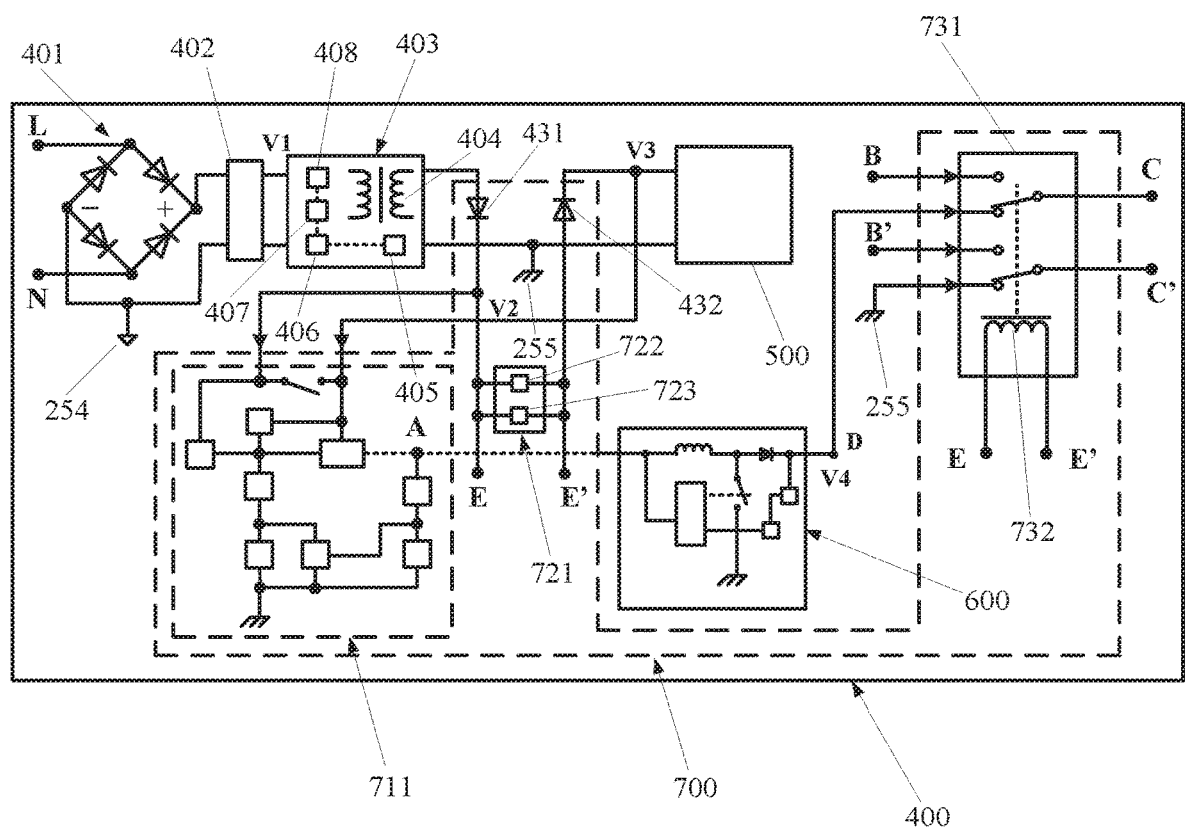
FIG. 1 is a block diagram of an add-on luminaire control gear according to the present disclosure.

FIG. 1 is a block diagram of an add-on luminaire control gear according to the present disclosure. The add-on luminaire control gear 400 comprises a rechargeable battery 500, a full-wave rectifier 401, an input filter 402, a charging circuit 403, at least one DC-to-DC converter 600, and a power detection and control circuit 700. In FIG. 1, the full-wave rectifier 401 is coupled to the AC mains and configured to convert the line voltage from the AC mains denoted as "L" and "N" into a first DC voltage, V1, after the input filter 402. The charging circuit 403 is an isolated step-down converter and comprises a first ground reference 254, a second ground reference 255 electrically isolated from the first ground reference 254, a transformer 404, a feedback control circuit 405, a control device 406, a first electronic switch 407, and a diode 408. The charging circuit 403 is coupled to the full-wave rectifier 401 via the input filter 402 and configured to convert the first DC voltage, V1, into a second DC voltage, V2, that charges the rechargeable battery 500 to reach a third DC voltage, V3. The feedback control circuit 405 is configured to monitor the second DC voltage, V2, and to regulate the control device 406 according to charging voltage and current requirements. The transformer 404 comprises a primary winding coupled to the first ground reference 254 and a secondary winding coupled to the second ground reference 255. The transformer 404 is configured to provide electrical isolation between the AC mains and the second DC voltage, V2, with respect to the second ground reference 255.

In FIG. 1, the power detection and control circuit 700 comprising a transistor circuit 711 and a relay switch 731. The transistor circuit 711 is configured to enable and disable the at least one DC-to-DC converter 600 via a port denoted as "A" according to availability of the AC mains, whereas the relay switch 731 comprises a power sensing coil 732 with a pick-up voltage and a drop-out voltage and is configured to couple either the fourth DC voltage, V4, or an external DC voltage to an external one or more LED arrays to operate thereon. The relay switch 731 further comprises a first pair, a second pair, and a third pair of input electrical terminals. The first pair of input electrical terminals denoted as "D" and the second ground reference 255 are configured to couple to the fourth DC voltage, V4, with respect to the second ground reference 255, whereas the second pair of input electrical terminals denoted as "BB'" are configured to couple to the external DC voltage with respect to a ground reference thereof. In this case, the relay switch 731 comprises a double-pole double-throw (DPDT) configuration, in which either the fourth DC voltage, V4, and the second ground reference 255 or the external DC voltage and its ground reference can be simultaneously coupled to the external one or more LED arrays to respectively operate thereon without crosstalk. The third pair of input electrical terminals denoted as "EE'" are configured to receive the pick-up voltage to operate the power sensing coil 732. The relay switch 731 further comprises a pair of output electrical terminals denoted as "CC'" configured to relay either the fourth DC voltage, V4, or the external DC voltage to the external one or more LED arrays to operate thereon. The external DC voltage is greater than the intrinsic forward voltage across the external one or more LED arrays, same as the fourth DC voltage, V4. However, the at least one DC-to-DC converter 600 provides an LED driving current less than an external LED driving current associated with the external DC voltage. In FIG. 1, the transistor circuit 711 is further configured to disable the relay switch 731 when required. The power detection and control circuit 700 further comprises a flyback module 721 comprising a diode 722 and a resistor 723 connected in parallel with the diode 722, in which the diode 722 is with a reverse polarity from the second DC voltage V2. The flyback module 721 is connected in parallel with the power sensing coil 732. When the second DC voltage, V2, is greater than the third DC voltage, V3, the pick-up voltage is built up for the power sensing coil 732 to operate. In FIG. 1, the power detection and control circuit 700 further comprises a first and a second current guiding diodes 431 and 432. The first current guiding diode 431 and the second current guiding diode 432 are configured to conduct a charging current in one direction and a discharging current in another direction such that the second DC voltage, V2, is distinct from the third DC voltage, V3. The charging circuit 403 may further comprise a capacitor (not shown) between the second DC voltage, V2, and the second ground reference 255.

Figure 2:
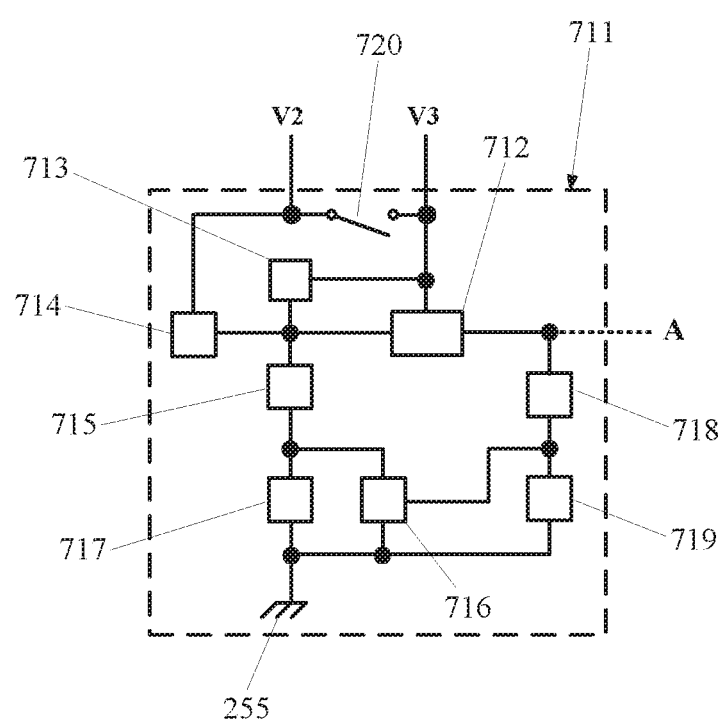
FIG. 2 is a block diagram of a transistor circuit according to the present disclosure.

FIG. 2 is a block diagram of a transistor circuit according to the present disclosure. The transistor circuit 711 comprises a first transistor 712, a first resistor 713, and at least one diode 714 and is configured to couple to the second DC voltage, V2, and the third DC voltage, V3, and to determine whether the line voltage from the AC mains is available or not. The first transistor 712 is turned on or off to allow or forbid the discharge current from the third DC voltage, V3, to flow into the at least one DC-to-DC converter 600 to enable and disable thereon. The transistor circuit 711 further comprises a second transistor 716, a second resistor 717, a voltage regulator 718, and a resistor-capacitor (RC) circuit 719. The second transistor 716, the second resistor 717, the voltage regulator 718, and the RC circuit 719 are configured to couple to the first transistor 712 to operate thereon. The transistor circuit 711 further comprises a pair of electrical terminals 715 coupled between the first resistor 713 and the second resistor 717, in which the pair of electrical terminals 715 is configured to couple the first transistor 712 to the second transistor 716 to operate the transistor circuit 711 when the pair of electrical terminals 715 are short-circuited. The pair of electrical terminals 715 may be short-circuited by using a jumper, a jumper wire, or a switch. The transistor circuit 711 further comprises a test switch 720 coupled between the second DC voltage, V2, and the third DC voltage, V3. When the test switch 720 is pressed, the drop-out voltage is reached, thereby disabling the power sensing coil 732. In this case, the first transistor 712 is turned on to enable the at least one DC-to-DC converter 600 via the port denoted as "A".

Figure 3:
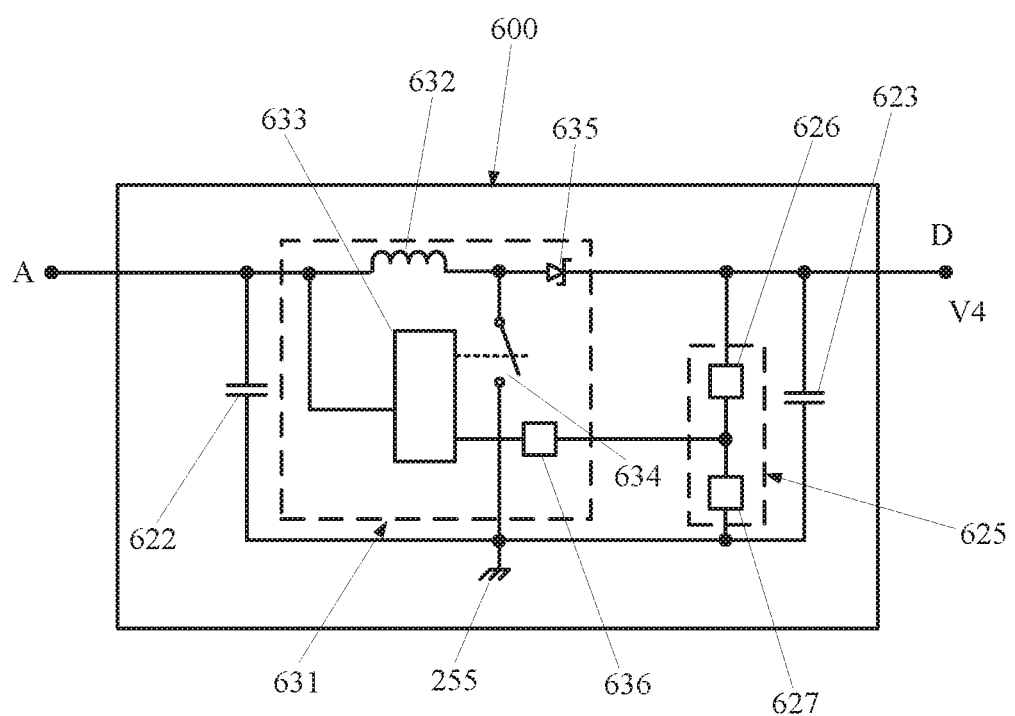
FIG. 3 is a block diagram of at least one DC-to-DC converter according to the present disclosure.

FIG. 3 is a block diagram of at least one DC-to-DC converter in the add-on luminaire control gear 400 according to the present disclosure. In FIG. 3, the at least one DC-to-DC converter 600 comprises a step-up converter 631 comprising an input inductor 632, a second electronic switch 634, a logic control device 633, at least one diode rectifier 635, and an error amplifier 636. The at least one DC-to-DC converter 600 further comprises an input capacitor 622, an output capacitor 623, and a voltage divider 625 comprising a first resistor 626 and a second resistor 627, in which the input capacitor 622 and the output capacitor 623 are configured to filter out unwanted voltage noises generated from the step-up converter 631 and to boost the third DC voltage, V3, into the fourth DC voltage, V4, with respect to the second ground reference 255. The error amplifier 636 is configured to extract part of the fourth DC voltage from the voltage divider 625 to control the logic control device 633. The second electronic switch 634 comprises a metal-oxide-semiconductor field-effect transistor (MOSFET) or a transistor. The at least one DC-to-DC converter 600 is configured to couple to the third DC voltage, V3, via the port denoted as "A" from the rechargeable battery 500 and to convert the third DC voltage, V3, into a fourth DC voltage, V4, when the line voltage from the AC mains is unavailable. The fourth DC voltage, V4, is greater than the intrinsic forward voltage across the external one or more LED arrays to make sure that the fourth DC voltage, V4, sent via the port denoted as "D", can operate the external one or more LED arrays when the line voltage from the AC mains is unavailable.

Figure 4:
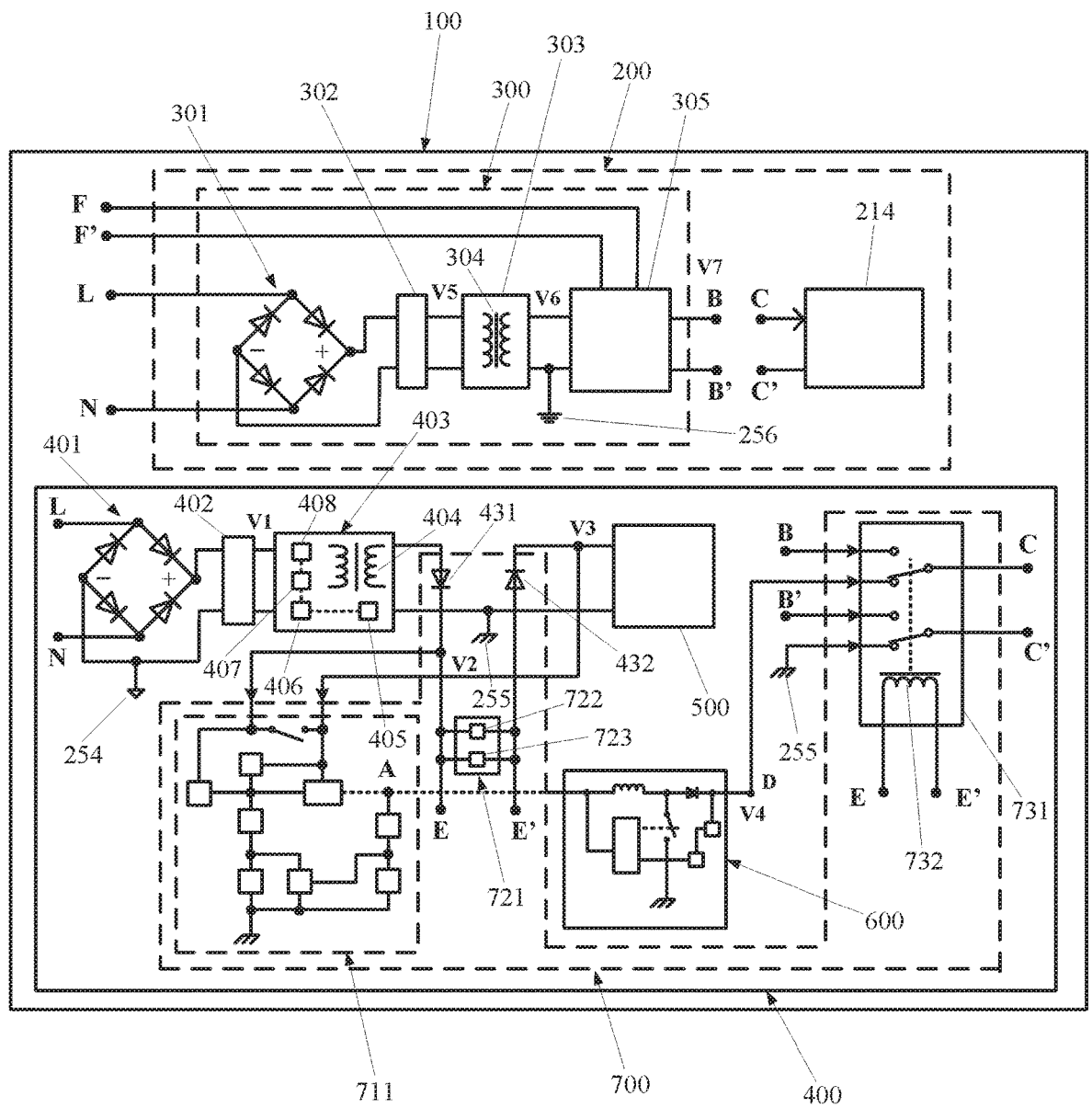
FIG. 4 is a block diagram of an LED lighting system with an add-on luminaire control gear according to the present disclosure.

FIG. 4 is a block diagram of an LED lighting system with an add-on luminaire control gear according to the present disclosure. In FIG. 4, the LED lighting system 100 comprises a luminaire 200 and an add-on luminaire control gear 400 is used to replace a fluorescent or an LED lamp normally operated with the AC mains. The luminaire 200 comprises one or more LED arrays 214 with an intrinsic forward voltage across thereon and a non-integrated power supply unit 300 (a power supply unit, hereinafter) with a luminaire DC voltage at ports denoted as "BB". When the line voltage from the AC mains is unavailable, the add-on luminaire control gear 400 is automatically started to provide a control DC voltage.

The power supply unit 300 comprises at least two electrical conductors denoted as "L" and "N" configured to couple to the line voltage from the AC mains, a first full-wave rectifier 301 coupled to the at least two electrical conductors, "L" and "N", and an input filter 302 configured to suppress electromagnetic interference (EMI) noises. The power supply unit 300 further comprises a first at least one DC-to-DC converter 305 and at least one isolated power converter 303 comprising a first transformer 304. The at least one isolated power converter 303 comprises a third ground reference 256 and is coupled to the first full-wave rectifier 301 via the input filter 302. The first full-wave rectifier 301 is configured to convert the line voltage from the AC mains into a fifth DC voltage, V5, after the input filter 302. The at least one isolated power converter 303 is configured to improve a power factor, to reduce voltage ripples, and to convert the fifth DC voltage, V5, into a sixth DC voltage, V6, when the line voltage from the AC mains is available. The first at least one DC-to-DC converter 305 is coupled to the at least one isolated power converter 303 and configured to convert the sixth DC voltage, V6, into a seventh DC voltage, V7, (i.e. the luminaire DC voltage) with respect to the third ground reference 256 at ports denoted as "BB'". The at least one isolated power converter 303 and the first at least one DC-to-DC converter 305 are combined to form a current source, in which when the one or more LED arrays 214 require more current than a predetermined maximum, the seventh DC voltage, V7, drops accordingly to maintain power conservation. The first at least one DC-to-DC converter 305 may comprise a pair of input ports denoted as "FF'". The pair of input ports FF' are configured to receive a 0-to-10 V signal, a 1-to-10 V signal, a pulse width modulation (PWM) signal, or a signal from a variable resistor for luminaire dimming applications. In FIG. 4, the one or more LED arrays 214 comprises a pair of electrical terminals denoted as "CC'". The pair of electrical terminals CC' are configured to receive a DC voltage to operate the one or more LED arrays 214. In the luminaire 200, the pal electrical terminals CC' is originally connected to the first at least one DC-to-DC converter 305 at the ports BB' to receive the seventh DC voltage V7 to operate the one or more LED arrays 214.

In FIG. 4, the add-on luminaire control gear 400 is almost the same as the one depicted in FIG. 1 except that the at least one DC-to-DC converter 600 in FIG. 1 becomes a second at least one DC-to-DC converter 600 to distinguish from the first at least one DC-to-DC converter 305 in the luminaire 200. Besides, the full-wave rectifier 401 in FIG. 1 becomes the second full-wave rectifier 401 because the first full-wave rectifier 301 has been used in the luminaire 200. Also, the second transformer 404 is used to distinguish from the first transformer 304 in the luminaire 200. In FIG. 4, the add-on luminaire control gear 400 comprises a rechargeable battery 500, a power detection and control circuit 700, and the second at least one DC-to-DC converter 600 configured to provide the control DC voltage when enabled. The power detection and control circuit 700 comprises a transistor circuit 711 and a relay switch 731, in which the former is configured to enable the second at least one DC-to-DC converter 600, and the latter is configured to couple either the control DC voltage or the luminaire DC voltage to the LED arrays 214 to operate thereon.

In FIG. 4, the add-on luminaire control gear 400 further comprises a second full-wave rectifier 401 and a charging circuit 403. The second full-wave rectifier 401 is coupled to the AC mains and configured to convert the line voltage from the AC mains denoted as "L" and "N" into a first DC voltage, V1, after the input filter 402. The charging circuit 403 is an isolated step-down converter and comprises the first ground reference 254, the second ground reference 255 electrically isolated from the first ground reference 254, the second transformer 404, the feedback control circuit 405, the control device 406, the first electronic switch 407, and the diode 408. The charging circuit 403 is coupled to the second full-wave rectifier 401 and configured to convert the first DC voltage, V1, into a second DC voltage, V2, that charges the rechargeable battery 500 to reach a third DC voltage, V3. The feedback control circuit 405 is configured to monitor the second DC voltage, V2, and to regulate the control device 406 according to charging voltage and current requirements. The second transformer 404 comprises a primary winding coupled to the first ground reference 254 and a secondary winding coupled to the second ground reference 255. The second transformer 404 is configured to provide electrical isolation between the AC mains and the second DC voltage, V2, with respect to the second ground reference 255.

In FIG. 4, the power detection and control circuit 700 comprising a transistor circuit 711 and a relay switch 731. The transistor circuit 711 is configured to enable and disable the second at least one DC-to-DC converter 600 according to availability of the AC mains, whereas the relay switch 731 comprises a power sensing coil 732 with the pick-up voltage and the drop-out voltage and is configured to couple either the fourth DC voltage, V4, or the seventh DC voltage, V7, to the one or more LED arrays 214 to operate thereon. The relay switch 731 further comprises the first pair, the second pair, and the third pair of input electrical terminals. The first pair of input electrical terminals denoted as "D" and the second ground reference 255 are configured to couple to the fourth DC voltage, V4, with respect to the second ground reference 255, whereas the second pair of input electrical terminals denoted as "BB'" are configured to couple to the seventh DC voltage, V7, with respect to the third ground reference 256. In this case, the relay switch 731 comprises the double-pole double-throw (DPDT) configuration, in which either the fourth DC voltage V4 and the second ground reference 255 or the seventh DC voltage, V7, and the third ground reference 256 can be simultaneously coupled to the one or more LED arrays 214 to respectively operate thereon without crosstalk. The third pair of input electrical terminals denoted as "EE'" are configured to receive the pick-up voltage to operate the power sensing coil 732. The relay switch 731 further comprises a pair of output electrical terminals denoted as "CC'". The pair of output electrical terminals CC' are configured to relay either the fourth DC voltage, V4, or the seventh DC voltage, V7, to the one or more LED arrays 214 to operate thereon. The seventh DC voltage, V7, is greater than the intrinsic forward voltage across the one or more LED arrays 214, same as the fourth DC voltage, V4. However, the second at least one DC-to-DC converter 600 provides an LED driving current less than the first at least one DC-to-DC converter 305 does. The transistor circuit 711 is further configured to disable the relay switch 731 when required. The power detection and control circuit 700 further comprises the flyback module 721 comprising the diode 722 and the resistor 723 connected in parallel with the diode 722, in which the diode 722 is with a reverse polarity from the second DC voltage, V2. The flyback module 721 is connected in parallel with the power sensing coil 732. When the second DC voltage, V2, is greater than the third DC voltage, V3, the pick-up voltage is built up for the power sensing coil 732 to operate. In FIG. 4, the power detection and control circuit 700 further comprises the first and the second current guiding diodes 431 and 432. The first current guiding diode 431 and the second current guiding diode 432 are configured to conduct the charging current in one direction and the discharging current in another direction such that the second DC voltage, V2, is distinct from the third DC voltage, V3. The charging circuit 403 may further comprise a capacitor (not shown) between the second DC voltage, V2, and the second ground reference 255.

Whereas preferred embodiments of the present disclosure have been shown and described, it will be realized that alterations, modifications, and improvements may be made thereto without departing from the scope of the following claims. Another kind of schemes with an add-on luminaire control gear adopted in an LED lighting system to operate a luminaire using various kinds of combinations to accomplish the same or different objectives could be easily adapted for use from the present disclosure. Accordingly, the foregoing descriptions and attached drawings are by way of example only and are not intended to be limiting.

What is claimed is:
1. An add-on luminaire control gear, comprising:
   a rechargeable battery;
   a full-wave rectifier coupled to alternating current (AC) mains and configured to convert a line voltage from the AC mains into a first direct current (DC) voltage;

a charging circuit comprising a transformer, a feedback control circuit, a control device, a first electronic switch, a diode, a first ground reference, and a second ground reference electrically isolated from the first ground reference, wherein the charging circuit is coupled to the full-wave rectifier and configured to convert the first DC voltage into a second DC voltage that charges the rechargeable battery to reach a third DC voltage, and wherein the feedback control circuit is configured to monitor the second DC voltage and to regulate the control device according to charging voltage and current requirements;

at least one DC-to-DC converter comprising a step-up converter comprising an input inductor, a second electronic switch, a logic control device, at least one diode rectifier, and an error amplifier, the at least one DC-to-DC converter configured to couple to the third DC voltage from the rechargeable battery and to convert the third DC voltage into a fourth DC voltage when the line voltage from the AC mains is unavailable; and a power detection and control circuit comprising a transistor circuit and a relay switch, wherein the transistor circuit is configured to enable and disable the at least one DC-to-DC converter according to availability of the AC mains, and wherein the relay switch comprises a power sensing coil with a pick-up voltage and a drop-out voltage and is configured to couple either the fourth DC voltage or an external DC voltage to an external one or more light-emitting diode (LED) arrays to operate thereon, wherein:

the relay switch further comprises a first pair of input electrical terminals, a second pair of input electrical terminals, and a third pair of input electrical terminals, wherein the first pair of input electrical terminals are configured to couple to the fourth DC voltage with respect to the second ground reference, wherein the second pair of input electrical terminals are configured to couple to the external DC voltage with respect to a ground reference thereof, and wherein the third pair of input electrical terminals are configured to receive the pick-up voltage to operate the power sensing coil;

the relay switch further comprises a pair of output electrical terminals configured to relay either the fourth DC voltage or the external DC voltage to the external one or more LED arrays to operate thereon; and the transistor circuit is further configured to disable the relay switch when required.

2. The add-on luminaire control gear of claim 1, wherein both the fourth DC voltage and the external DC voltage are greater than an intrinsic forward voltage across the external one or more LED arrays.

3. The add-on luminaire control gear of claim 1, wherein the at least one DC-to-DC converter provides an LED driving current less than an external LED driving current associated with the external DC voltage.

4. The add-on luminaire control gear of claim 1, wherein the relay switch further comprises a double-pole double-throw (DPDT) configuration, and wherein either the fourth DC voltage and the second ground reference or the external DC voltage and the ground reference thereof can be simultaneously coupled to the external one or more LED arrays to respectively operate thereon without crosstalk.

5. The add-on luminaire control gear of claim 1, wherein the power detection and control circuit further comprises a flyback module comprising a diode and a resistor connected in parallel with the diode, wherein the diode is with a reverse polarity from the second DC voltage, wherein the flyback module is connected in parallel with the power sensing coil, and wherein, when the second DC voltage is greater than the third DC voltage, the pick-up voltage is built up for the power sensing coil to operate.

6. The add-on luminaire control gear of claim 1, wherein the transistor circuit comprises a first transistor, a first resistor, and at least one diode, wherein the transistor circuit is configured to couple to the second DC voltage and the third DC voltage and to determine whether the line voltage from the AC mains is available or not, and wherein the first transistor is turned on or off to allow or to forbid a discharge current from the third DC voltage to flow into the at least one DC-to-DC converter to enable and disable thereon.

7. The add-on luminaire control gear of claim 6, wherein the transistor circuit further comprises a second transistor, a second resistor, a voltage regulator, and a resistor-capacitor (RC) circuit, and wherein the second transistor, the second resistor, the voltage regulator, and the RC circuit are configured to couple to the first transistor to operate thereon.

8. The add-on luminaire control gear of claim 7, wherein the transistor circuit further comprises a pair of electrical terminals coupled between the first resistor and the second resistor, and wherein the pair of electrical terminals are configured to couple the first transistor to the second transistor to operate the transistor circuit when the pair of electrical terminals are short-circuited.

9. The add-on luminaire control gear of claim 8, wherein the pair of electrical terminals are short-circuited by using a jumper, a jumper wire, or a switch.

10. The add-on luminaire control gear of claim 7, wherein the transistor circuit further comprises a test switch coupled between the second DC voltage and the third DC voltage, wherein, when the test switch is pressed, the drop-out voltage is reached, thereby disabling the power sensing coil, and wherein, when the test switch is pressed, the first transistor is turned on to enable the at least one DC-to-DC converter.

11. The add-on luminaire control gear of claim 1, wherein the at least one DC-to-DC converter further comprises a voltage divider, an input capacitor, and an output capacitor, wherein the error amplifier is configure to extract part of the fourth DC voltage from the voltage divider to control the logic control device, and wherein the input capacitor and the output capacitor are configured to filter out unwanted voltage noises generated from the step-up converter and to boost the third DC voltage into the fourth DC voltage with respect to the second ground reference.

12. The add-on luminaire control gear of claim 1, wherein each of the first electronic switch and the second electronic switch comprises a metal-oxide-semiconductor field-effect transistor (MOSFET) or a transistor.

13. The add-on luminaire control gear of claim 1, wherein the power detection and control circuit further comprises a first current guiding diode and a second current guiding diode, the first current guiding diode and the second current guiding diode configured to conduct a charging current in one direction and a discharging current in another direction such that the second DC voltage is distinct from the third DC voltage.

14. A light-emitting diode (LED) lighting system, comprising:

a luminaire, comprising:

one or more LED arrays with an intrinsic forward voltage across thereon; and a power supply unit, comprising:

at least two electrical conductors configured to couple to a line voltage from alternating-current (AC) mains;

an input filter configured to suppress electromagnetic interference (EMI) noises;

a first full-wave rectifier coupled to the at least two electrical conductors, the first full-wave rectifier configured to convert the line voltage from the AC mains into a fifth DC voltage;

at least one isolated power converter comprising a first transformer and a third ground reference, wherein the at least one isolated power converter is coupled to the first full-wave rectifier via the input filter and configured to improve a power factor, to reduce voltage ripples, and to convert the fifth DC voltage into a sixth DC voltage when the line voltage from the AC mains is available; and a first at least one DC-to-DC converter coupled to the at least one isolated power converter, the first at least one DC-to-DC converter configured to convert the sixth DC voltage into a seventh DC voltage with respect to the third ground reference; and an add-on luminaire control gear, comprising:

a rechargeable battery;

a second full-wave rectifier coupled to the AC mains and configured to convert the line voltage from the AC mains into a first DC voltage;

a charging circuit comprising a second transformer, a feedback control circuit, a control device, a first electronic switch, a diode, a first ground reference, and a second ground reference electrically isolated from the first ground reference, wherein the charging circuit is coupled to the second full-wave rectifier and configured to convert the first DC voltage into a second DC voltage that charges the rechargeable battery to reach a third DC voltage, and wherein the feedback control circuit is configured to monitor the second DC voltage and to regulate the control device according to charging voltage and current requirements;

a second at least one DC-to-DC converter comprising a step-up converter comprising an input inductor, a second electronic switch, a logic control device, at least one diode rectifier, and an error amplifier, the second at least one DC-to-DC converter configured to couple to the third DC voltage from the rechargeable battery and to convert the third DC voltage into a fourth DC voltage when the line voltage from the AC mains is unavailable; and a power detection and control circuit comprising a transistor circuit and a relay switch, wherein the transistor circuit is configured to enable and disable the at least one DC-to-DC converter according to availability of the AC mains, and wherein the relay switch comprises a power sensing coil with a pick-up voltage and a drop-out voltage and is configured to couple either the fourth DC voltage or the seventh DC voltage to the one or more LED arrays to operate thereon, wherein:

the at least one isolated power converter and the first at least one DC-to-DC converter are combined to form a current source, wherein, when the one or more LED arrays require more current than a predetermined maximum, the seventh DC voltage drops accordingly;

the relay switch further comprises a first pair, a second pair, and a third pair of input electrical terminals, wherein the first pair of input electrical terminals are configured to couple to the fourth DC voltage with respect to the second ground reference, wherein the second pair of input electrical terminals are configured to couple to the seventh DC voltage with respect to the third ground reference, and wherein the third pair of input electrical terminals are configured to receive the pick-up voltage to operate the power sensing coil;

the relay switch further comprises a pair of output electrical terminals configured to relay either the fourth DC voltage or the seventh DC voltage to the one or more LED arrays to operate thereon; and the transistor circuit is further configured to disable the relay switch when required.

15. The LED lighting system of claim 14, wherein both the fourth DC voltage and the seventh DC voltage are greater than the intrinsic forward voltage across the one or more LED arrays.

16. The LED lighting system of claim 14, wherein the second at least one DC-to-DC converter provides an LED driving current less than the first at least one DC-to-DC converter does.

17. The LED lighting system of claim 14, wherein the first at least one DC-to-DC converter comprises a pair of input ports configured to receive a 0-to-10 V signal, a 1-to-10 V signal, a pulse width modulation (PWM) signal, or a signal from a variable resistor for luminaire dimming applications.

18. The LED lighting system of claim 14, wherein the relay switch further comprises a double-pole double-throw (DPDT) configuration, and wherein either the fourth DC voltage and the second ground reference or the seventh DC voltage and the third ground reference can be simultaneously coupled to the one or more LED arrays to respectively operate thereon without crosstalk.

19. The LED lighting system of claim 14, wherein the power detection and control circuit further comprises a flyback module comprising a diode and a resistor connected in parallel with the diode, wherein the diode is with a reverse polarity from the second DC voltage, wherein the flyback module is connected in parallel with the power sensing coil, and wherein, when the second DC voltage is greater than the third DC voltage, the pick-up voltage is built up for the power sensing coil to operate.

20. The LED lighting system of claim 14, the transistor circuit comprises a first transistor, a first resistor, and at least one diode, wherein the transistor circuit is configured to couple to the second DC voltage and the third DC voltage and to determine whether the line voltage from the AC mains is available or not, and wherein the first transistor is turned on or off to allow or to forbid a discharge current from the third DC voltage to flow into the second at least one DC-to-DC converter to enable and disable thereon.

21. The LED lighting system of claim 20, wherein the transistor circuit further comprises a second transistor, a second resistor, a voltage regulator, and a resistor-capacitor (RC) circuit, and wherein the second transistor, the second resistor, the voltage regulator, and the RC circuit are configured to couple to the first transistor to operate thereon.

22. The LED lighting system of claim 20, wherein the transistor circuit further comprises a pair of electrical terminals coupled between the first resistor and the second resistor, and wherein the pair of electrical terminals are configured to couple the first transistor to the second transistor to operate the transistor circuit when the pair of electrical terminals are short-circuited.

23. The LED lighting system of claim 22, wherein the pair of electrical terminals are short-circuited by using a jumper, a jumper wire, or a switch.

24. The LED lighting system of claim 20, wherein the transistor circuit further comprises a test switch coupled between the second DC voltage and the third DC voltage, wherein, when the test switch is pressed, the drop-out voltage is reached, thereby disabling the power sensing coil, and wherein, when the test switch is pressed, the first transistor is turned on to enable the second at least one DC-to-DC converter.

25. The LED lighting system of claim 14, wherein the second at least one DC-to-DC converter further comprises a voltage divider, an input capacitor, and an output capacitor, wherein the error amplifier is configured to extract part of the fourth DC voltage from the voltage divider to control the logic control device, and wherein the input capacitor and the output capacitor are configured to filter out unwanted voltage noises generated from the step-up converter and to boost the third DC voltage into the fourth DC voltage with respect to the second ground reference.

26. The LED lighting system of claim 14, wherein each of the first electronic switch and the second electronic switch comprises a metal-oxide-semiconductor field-effect transistor (MOSFET) or a transistor.

27. The LED lighting system of claim 14, wherein the power detection and control circuit further comprises a first current guiding diode and a second current guiding diode, the first current guiding diode and the second current guiding diode configured to conduct a charging current in one direction and a discharging current in another direction such that the second DC voltage is distinct from the third DC voltage.

* * * * *